D. BACON.
ELECTROMAGNETIC STOP MECHANISM FOR SHUTTLE LOOMS.
APPLICATION FILED FEB. 8, 1907.
905,131.
Patented Dec. 1, 1908.
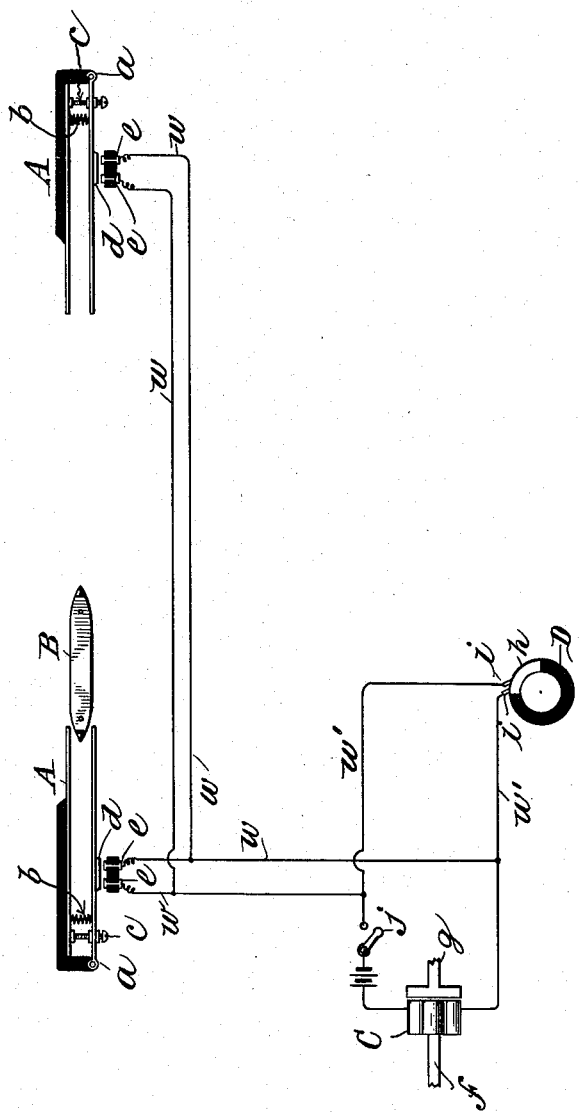

UNITED STATES PATENT OFFICE.

DANIEL BACON, OF NEW YORK, N. Y.

ELECTROMAGNETIC STOP MECHANISM FOR SHUTTLE-LOOMS.

No. 905,131.     Specification of Letters Patent.     Patented Dec. 1, 1908.

Application filed February 8, 1907. Serial No. 356,350.

*To all whom it may concern:*

Be it known that I, DANIEL BACON, a citizen of the United States, and a resident of Brooklyn borough, city, county, and State of New York, have invented certain new and useful Improvements in Electromagnetic Stop Mechanisms for Shuttle-Looms, of which the following is a specification.

The object of my invention is to provide an electro-magnetic stop mechanism for shuttle looms by means of which the loom is caused to stop automatically should the shuttle for any reason fail to reach the box to which it is thrown. To accomplish this result I equip a loom with electro-magnetic devices so arranged that the driving shaft of the loom is operated only when an electromagnetic device is electrically energized and this electrical energy is supplied when the shuttle remains in the box by causing the pressure of the shuttle in the box to close the electric circuit and when the shuttle is not in the box but is passing from one box to another electrical connection is made only for a fixed interval corresponding to the normal time required for the shuttle to clear itself from one box and enter another.

My invention consists therefore in electromagnetic stop mechanism for shuttle looms which consists of an electrical controlling device governing the movements of the driving shaft of the loom, a number of shuttle boxes adapted to close an electric circuit when the shuttle is in the box and an auxiliary circuit closer timed to close the circuit during the normal passage of the shuttle from one box to another; both circuit closers coöperating to energize said electrical controlling device during the normal operation of the loom.

One form of my invention is shown in the accompanying diagrammatic drawing in which A, A represent two shuttle boxes, placed opposite each other at the ends of the shuttle race.

B is the shuttle.

One side of the shuttle box is hinged as shown at $a$, and is normally drawn toward the other side by a spring $b$, fastened to both sides the limit of motion being controlled by the adjustable stop $c$. This hinged side carries a contact plate $d$ of brass or other conducting material. The mouth of the box which may be flaring if desired is so adjusted that the shuttle in entering has to spread the mouth sufficiently to bring the contact plate against the circuit closer posts $e, e$, whereby current is established through the wires $w, w$, to the battery or other source of electricity and through the electrical controlling device C. This electrical controlling device may be any well known electromagnetic clutch mounted on the power shaft $f$, which is driven from a source of power not shown and from which power is transmitted through the medium of said electromagnetic clutch to the driving shaft $g$ of the loom. Thus communication only takes place when the controlling device C is energized by a current passing through its magnets, and when this current is broken the loom is free to be stopped either gradually by overcoming its own inertia or abruptly by any of the usual brakes or stop motions.

Under normal conditions the shuttle B should take a definite and uniform time in passing from one box to the other and during this interval I provide an auxiliary means for keeping the electrical controlling device energized. This consists of a wheel or disk D mounted upon any convenient revolving part of the loom and provided with a contact plate $h$ of a surface proportioned to the fixed time normally consumed by the shuttle in its throw. The rest of the periphery of the wheel D is preferably faced with insulating material and two contact fingers $i, i,$ are provided which hang by gravity so as always to rest on some part of the periphery of the disk, D. These contact fingers are connected to the battery through the electric controlling device and therefore the said controlling device is energized whenever the circuit is established by means of the contact plate $h$.

A switch $j$ is provided by means of which the electric circuit may be opened or closed by hand as desired.

The operation of my improved stop mechanism is as follows:—When the loom is set up and ready to run the switch $j$, is turned so as to complete the energizing circuit, the shuttle being then in one of the boxes A, A. The shaft $f$, therefore picks up the driving shaft $g$, and starts the loom. The wheel D turns and the energizing current continues to flow through the controlling device C as long as the shuttle passes regularly from one box to the other in the process of weaving; the circuit being completed through the contact plate $h$ as the shuttle leaves one box until said plate moves from beneath the contact fingers $i, i$. If at this time the shuttle has entered the opposite box there will be no break in the current but if for any reason the shuttle should fail to reach the box the circuit will be left open by the contact plate $h$ and therefore the controlling device C, will cease to be energized, resulting in the stoppage of the loom.

I claim:—

An electro-magnetic stop mechanism for shuttle looms which consists of an electrically operated clutch governing the movements of the driving shaft of the loom, a plurality of shuttle boxes adapted to close an electric circuit when the shuttle is in either box and an auxiliary circuit closer timed to close the circuit during the normal passage of the shuttle from one box to another; both circuit closers coöperating to energize said electrically operated clutch during the normal operation of the loom.

DANIEL BACON.

Witnesses:
W. P. PREBLE, Jr.,
ANNA H. VAN HOVENBERG.